US006716466B2

(12) United States Patent
Kuslys et al.

(10) Patent No.: US 6,716,466 B2
(45) Date of Patent: Apr. 6, 2004

(54) BALANCED FOOD POWDER COMPOSITION

(75) Inventors: Martinas Kuslys, Grosshoechstetten (CH); Steven Soon-Young Kwon, Pasadena, CA (US); Harold Sawyer, Barrington, IL (US); Catherine Marie Russe, Lincolnwood, IL (US); Sarah Lathrop Steele, Libertyville, IL (US)

(73) Assignee: Nestec S.A., Vevey (CH)

( * ) Notice: Subject to any disclaimer, the term of this patent is extended or adjusted under 35 U.S.C. 154(b) by 185 days.

(21) Appl. No.: 09/760,727

(22) Filed: Jan. 17, 2001

(65) Prior Publication Data

US 2002/0094358 A1 Jul. 18, 2002

(51) Int. Cl.$^7$ ................................................. A23L 3/40
(52) U.S. Cl. ....................................... 426/443; 426/652
(58) Field of Search ........................... 426/72, 73, 74, 426/96, 443, 801, 800, 804, 810, 453, 652

(56) References Cited

U.S. PATENT DOCUMENTS

| | | | | |
|---|---|---|---|---|
| 4,753,926 A | * | 6/1988 | Lucas et al. ................ 426/2 |
| 5,013,569 A | * | 5/1991 | Rubin ...................... 426/585 |
| 5,104,676 A | * | 4/1992 | Mahmoud et al. .......... 424/439 |
| 5,562,941 A | | 10/1996 | Levy ........................ 426/433 |
| 5,589,468 A | | 12/1996 | Lin et al. ..................... 514/52 |
| 5,595,772 A | * | 1/1997 | Wurtman et al. ............ 426/106 |
| 5,902,797 A | * | 5/1999 | Bell et al. .................... 424/439 |
| 5,904,948 A | * | 5/1999 | Sartorio et al. .............. 426/453 |
| 5,916,612 A | | 6/1999 | Bonnasse et al. ............. 426/96 |
| 6,013,290 A | * | 1/2000 | Weinstein et al. ........... 424/439 |
| 6,248,375 B1 | * | 6/2001 | Gilles et al. ................. 424/439 |
| 6,346,284 B1 | * | 2/2002 | Briend et al. ................ 424/439 |
| 6,365,218 B1 | * | 4/2002 | Borschel et al. ............. 426/573 |
| 2001/0049352 A1 | * | 12/2001 | Mark et al. ..................... 514/2 |
| 2002/0031576 A1 | * | 3/2002 | Barrett-Reis et al. .......... 426/72 |

* cited by examiner

Primary Examiner—Carolyn Paden
(74) Attorney, Agent, or Firm—Winston & Strawn LLP

(57) ABSTRACT

A balanced powder blend composition with at least one fat or oil source, at least one carbohydrate source, and at least one protein source, is described. This composition is advantageously added to a food to supplement the nutritional value of the food, but without substantially altering the taste of the food. The energetic amount of protein is between about 20% and 30%, the energetic amount of oil is between about 40% and 50%, and the energetic amount of carbohydrate is between about 25% and 35%. The carbohydrate source can be maltodextrin, the fat or oil source can be canola oil and/or milk fat, and the protein source can be whey protein, casein, a casein salt, or a mixture thereof. The mixture is prepared by admixing the ingredients with water, heating and homogenizing the mixture, and spray drying the mixture into a powder. An emulsifier can be added to the composition.

15 Claims, No Drawings

BALANCED FOOD POWDER COMPOSITION

FIELD OF THE INVENTION

The present invention concerns the use of a balanced food powder blend composition, more particularly to a neutral powder composition that contains a balanced quantity of carbohydrate, fat or oil, and protein.

BACKGROUND OF THE INVENTION is known in clinical nitiation, such as in enteral feeding, to have a composition comprising a protein source, a carbohydrate source and a lipid source. This is the object of U.S. Pat. No. 5,589,468 concerning a liquid enteral feeding designed for elderly patients.

U.S. Pat. No. 5,916,612, the entire contents of which is incorporated herein by reference, describes a granular food product for preparation of instant foods that is prepared by mixing an oil or fat with an edible carbohydrate and/or protein powder materials to obtain a first mixture, and then further edible carbohydrate and/or protein powder materials are mixed with the first mixture to obtain a second mixture which is powdery or dough-like and that mixture is formed into granules by moistening and particle-to-particle contacting, and then the granules are dried.

The present invention relates to production of a free flowing and rapidly dispersible and/or soluble granular food product.

There are also commercially available on the market products providing either proteins, calories, or both, but these products do not provide a balanced blend of nutrients, they alter the taste of food, and they are not cost effective sources of either calories or proteins.

What is needed is a composition for normal human consumption, which can be directly and simultaneously added to a meal.

SUMMARY OF THE INVENTION

It is an object of the present invention to provide to the consumer a product which can be added to a meal, wherein the product has a balanced caloric and protein content, is not expensive, and does not alter the taste of the basic food. All these objectives are met according to the invention which concerns the use of a balanced powder blend composition that includes at least one fat or oil source, at least one carbohydrate source, and at least one protein source, wherein said composition is added to a food.

In one aspect, the invention includes a balanced powder composition for adding to food. The balanced powder composition includes at least one fat or oil source, at least one carbohydrate source, and at least one protein source. The balanced powder composition is substantially devoid of flavor so that it can be admixed with different foodstuffs without substantially changing the flavor or texture of the foodstuffs. The balanced powder composition has an energetic amount of protein between about 20% and 30%, of fat or oil between about 40% and 50%, and of carbohydrate between about 25% and 35%. The balanced powder composition may further include an emulsifier at between about 0.1 to about 1% by weight. In one preferred embodiment, the carbohydrate source includes maltodextrin, the fat or oil source includes canola oil, and the protein source includes whey protein, casein, a casein salt, or a mixture thereof.

In a second aspect of the invention, the invention includes a method of manufacturing the above-described balanced powder composition. The method includes admixing between about 0.8 and 1.2 parts fat or oil, between about 1.5 and 2 parts carbohydrate, between about 1.2 and 1.6 parts protein, between about 0.01 and 0.03 parts emulsifier, and between about 1.1 and about 1.7 parts water to form a mixture. This mixture is then heated to between about 70° C. and about 85° C. Of course, individual components and/or the mixture may be preheated. The next step involves homogenizing the mixture. Finally, the homogenized mixture is dried to form a free flowing powder, for example by spray drying. The powder composition has a neutral flavor and is substantially devoid of flavor when admixed with another food.

In a third aspect of the invention, the invention includes a method of enhancing the nutritional value of a food. The method includes the steps of providing a powder composition of neutral flavor comprising at least one fat or oil source, at least one carbohydrate source and at least one protein source; and adding the powder composition to a food, and wherein the powder composition does not change the flavor of the food.

DETAILED DESCRIPTION OF THE INVENTION

The composition of the invention is a balanced powder blend composition, where the balance concerns both the energetic content as well as the protein content. This is a product which can be very conveniently used: the consumer has only to sprinkle it on or admix it with the considered food. The product enhances the basic food by reducing the possible deficiencies of the basic meal of certain persons.

The powder blend composition of the present invention can be used in all different types of food, including both hot food and cold food. For example, concerning hot food, it is possible to use the composition in a soup, in a gravy, on vegetables, an a meat or incorporated into a meat, on cooked potatoes and also in liquids, for example coffee or tea. Exemplary use with cold food includes adding the composition to milk or to ice-cream.

The composition of the present invention can be used in hospitals, in the food service area, in the clinical nutrition area, and also for private use. The product can also be used as a food supplement in various nutriceutical formulations and beverages.

As stated above, one objective of the invention is to have an absolutely neutral composition, so that it is possible to use the composition very broadly. The composition is advantageously tasteless, or contains a very neutral flavor that is easily masked by other foods.

In one embodiment, there are no vitamins and/or mineral supplements added the composition, so that it is possible to keep the price of said product very low. But, it is also possible to add in the composition of the invention vitamins and/or minerals. In one embodiment, the composition provides at least 100% of the USRDA of selected vitamins and minerals.

In one embodiment, there is no dietary fiber added to the composition. Fiber may interfere with using the composition with various foods. In one embodiment, the composition may contain a soluble fiber.

The carbohydrate source used in the composition is preferably maltodextrin. The use of other carbohydrates may lead to a too sweet product. Any type of maltodextrin can be used, for example maltodextrin from corn syrup or any other vegetable material.

The fat or oil source used in the composition can be either a vegetable fat or oil or an animal fat or oil or a mixture thereof. The vegetable fat or oil is preferably taken from the group consisting of soy oil, corn oil, rapeseed oil, sunflower oil, palmolein, alone or in mixture. In a preferred composition, the rapeseed oil is canola oil. In the case of animal oil or fat, the source is preferably milk fat.

The protein source used in the composition is preferably whey protein, casein, a casein salt, or a mixture thereof. The ratio whey protein to casein and/or casein salt in a mixture can advantageously vary from 1:10 to 1:0.1, preferably from 1:4 to 1:0.25. For example, in one embodiment the ratio by weight of whey protein to casein and/or casein salt may range from 1:4 to 1:1.

The composition of the present invention contains protein that provides between about 20% and about 30% of the energetic content of the composition. The energetic contribution of fat and/or oil is between about 40% to about 50% of the energetic content of the composition. The energetic contribution of carbohydrate is between about 28% to about 32% of the energetic content of the composition. In a preferred embodiment, the composition of the present invention contains protein that provides between about 20% and about 30%, fat and/or oil that provides between about 44% to about 46%, and carbohydrate that provides between about 28%, to about 32% of the energetic content of the composition.

More specifically, the powder blend composition has an energetic amount of protein of around 25%, an energetic amount of fat or oil of around 45%, and an energetic amount of carbohydrate of around 30%.

The powder blend composition of the present invention typically has, by weight, between about 26% to about 36% of protein, between about 20% and about 30% of fat or oil, and between about 35% and about 45% of carbohydrate. In one preferred embodiment, the composition has, in weight percent, a fat content of about 25%, a protein content of about 31% and a carbohydrate content of about 40%.

In this preferred embodiment, the protein is a mixture of whey protein and casein, the carbohydrate is corn syrup, and the oil is canola oil.

The composition of the invention is prepared in the following way. An aqueous phase of the protein, the carbohydrate and the oil or fat is prepared. An emulsifier is advantageously added as needed. In one embodiment, the aqueous phase includes between about 0.8 and 1.2 parts fat or oil, between about 1.2 and 1.6 parts protein, between about 1.5 and 2 parts carbohydrate, between about 0.01 and 0.03 parts emulsifier, and between about 1.1 and about 1.7 parts water. The emulsifier is any food-grade emulsifier, preferably lecithin. The mixture is heated, i.e., preheated, then heated, for example, with steam. Advantageously, the mixture is heated to a temperature between about 70° C. and about 85° C. The mixture is then homogenized, and finally is spray-dried. The powder is advantageously free flowing. The powder is recovered and the filling/packaging can be carried out.

It is also possible to add in the composition of the invention further components, like a prebiotic, a flavor enhancer, and a thickener, alone or in combination.

The prebiotic compound known can be any known in the art. The flavor enhancer similarly can be any flavor enhancer known in the art. The thickener can be any thickener known in the art. The composition can also be supplemented with vitamins, minerals, micronutrients, and/or antioxidants. It may be advantageous to add these additives to the mixture prior to homogenizing and drying the powder. Alternatively, the powder of the present invention can be admixed with other powders, for example salts, minerals, and the like, and packaged.

The filling is carried out according to known procedures. It is either possible to fill in a large amount for the food-service area or for hospitals, or in smaller quantities for private use. In the case of the smaller quantities, it is convenient to have quantities for one meal or one day: so, in these cases, the dosages and packaging contain about 10 to 20 grams of the composition. The quantity is not a critical issue.

The powder blend product is preferably prepared and packaged to have a shelf-life at room temperature of at least 12 months. The composition of the invention is ready to use and can be easily dissolved, dispersed or sprinkled on the corresponding food, in solid or liquid form. It is clear that the dissolution is better in or on hot food.

The powder preferably is devoid of any flavor, or at the least has a neutral flavor, so that the powder can he admixed with a wide variety of food-stuffs without changing the flavor of the foodstuffs.

If you consider this addition every day, it is possible to reach a well balanced food intake for persons of a certain age. Because of the neutral taste, there is no influence on the taste of the basic food.

EXAMPLES

By way of example, a suitable composition according to the invention is as follows.

Example 1

A total of 1000 Kg of sodium caseinate, 230 kg of whey protein, 1500 kg of corn syrup and 870 kg of canola oil were dissolved in 1200 kg of water with 18 kg of lecithin as emulsifier. The mixture was preheated, and then steam heated at 77° C. The mixture was mixed sufficiently to become homogenized. The homogenized mixture was then spray-dried to obtain 3600 kg of the balanced powder blend composition. This composition had, in weight percent, a fat content of 25%, a protein content of 31% and a carbohydrate content of 40%. Concerning the protein content, the whey protein represents 20% (46 Kg) and the caseinate 80% (184 Kg). Considering the composition on the energetic point of view, the protein amount was 25%, the oil amount was 45% and the carbohydrate amount was 30%.

Example 2

A total of 20 g of the composition of Example 1 was added to a soup, wherein it brings the necessary lack of calories and protein. The composition dissolved in the soup and there was no discernable taste difference from untreated soup.

What is claimed is:

1. A method of enhancing the energetic and protein content of a food without affecting the taste of the food, which comprise providing a powder composition of neutral flavor comprising at least one fat or oil source, least one protein source, and maltodextrin, wherein the energetic amount of protein is between about 20% and 30%, the energetic amount of fat or oil is between about 40% and 50%, and the energetic amount of maltodextrin is between about 25% and 35% f the composition; and adding the powder composition to a food wherein the powder composition does not change the flavor of the food.

2. The method of claim 1, wherein the food is a soup, a gravy, a vegetable, a meat, cooked potatoes, or liquid coffee.

3. The method of claim 1, wherein the food is milk, ice cream, or a beverage.

4. The method of claim 1, wherein powder composition further comprises an emulsifier.

5. The method of claim 1, wherein the fat or oil source is selected from the group consisting of soy oil, corn oil, rapeseed oil, sunflower oil, palmolein, or a mixture thereof.

6. The method of claim 1, wherein fat or oil source consists substantially of canola oil.

7. The method of claim 1, wherein the at least one fat or oil source is milk fat.

8. The method of claim 1, wherein the one fat or oil source is milk fat, and further wherein the protein is taken from the group consisting of whey protein, casein, a casein salt and a mixture thereof.

9. The method of claim 1, wherein the energetic amount of protein is between about 23% and 27%, the energetic amount of fat or oil is between about 43% and 47%, and the energetic amount of maltodextrin is between about 28% and 32%.

10. The method of claim 1, wherein the energetic amount of protein is about 25%, the energetic amount of fat or oil is about 45%, and the energetic amount of maltodextrin is about 30%.

11. The method of claim 1, wherein the composition is packed in dosages of between about 10 grams to about 20 grams.

12. The method of claim 1, wherein the composition further comprises a prebiotic, a flavor enhancer, an emulsifier, a thickener, or a combination thereof.

13. The method of claim 1, wherein the composition further comprises vitamins, minerals, micronutrients, antioxidants, or a combination thereof.

14. The method of claim 1, wherein the protein comprises whey, casein, casein salt, or a mixture thereof, corn syrup is present as a carbohydrate, and the oil comprises canola oil.

15. The method of claim 1, wherein the step of providing the method of powder composition of neutral flavor comprises admixing between about 0.8 and 1.2 parts fat or oil, between about 1.5 and 2 parts maltodextrin, between about 1.2 and 1.6 parts protein, between about 0.01 and 0.03 parts emulsifier, and between 1.1 and about 1.7 parts water to form a mixture; heating the mixture to between about 70° C. and about 85° C.; homogenizing the mixture; and drying the mixture to form a free flowing powder.

* * * * *

UNITED STATES PATENT AND TRADEMARK OFFICE
CERTIFICATE OF CORRECTION

PATENT NO. : 6,716,466 B2
DATED : April 6, 2004
INVENTOR(S) : Kuslys et al.

It is certified that error appears in the above-identified patent and that said Letters Patent is hereby corrected as shown below:

Column 4,
Line 54, change "fat or oil source, least one" to -- fat or oil source, at least one --; and
Line 59, change "about 25% and 35% f the composition;" to -- about 25% and 35% of the composition; --.

Signed and Sealed this

Ninth Day of November, 2004

JON W. DUDAS
*Director of the United States Patent and Trademark Office*